United States Patent
Russell

(10) Patent No.: US 6,731,824 B2
(45) Date of Patent: May 4, 2004

(54) SPATIAL FILTERING METHOD FOR FAILURE ANALYSIS OF A DEVICE

(75) Inventor: Jeremy D. Russell, Hsinchu (TW)

(73) Assignee: PROMos Technologies, Inc., Hsinchu (TW)

(*) Notice: Subject to any disclaimer, the term of this patent is extended or adjusted under 35 U.S.C. 154(b) by 547 days.

(21) Appl. No.: 09/788,615

(22) Filed: Feb. 21, 2001

(65) Prior Publication Data

US 2002/0150303 A1 Oct. 17, 2002

(51) Int. Cl.[7] .................................................. G06K 9/42
(52) U.S. Cl. ........................ 382/280; 382/260; 382/275; 382/145; 382/257
(58) Field of Search ................................. 382/145, 168, 382/257, 260, 275, 280, 274; 356/237.1

(56) References Cited

U.S. PATENT DOCUMENTS

| | | | |
|---|---|---|---|
| 5,506,676 A | 4/1996 | Hendler et al. | 250/559.09 |
| 5,537,669 A | 7/1996 | Evans et al. | 382/278 |
| 5,917,940 A | * 6/1999 | Okajima et al. | 382/173 |
| 6,021,214 A | 2/2000 | Evans et al. | 382/141 |
| 6,187,483 B1 | * 2/2001 | Capodieci et al. | 430/5 |

OTHER PUBLICATIONS

"Image Processing for Defect Location in Integrated Circuits", J D Russell and B Holt, Institute of Physics Conference Series 93, vol. 2, Jan. 1988, p129–130.

"SEM–EBIC Inspection of VLSI Circuits Using Image Processing" J D Russell, Jun. 1990, Department of Materials, Imperial College of Science, Technology and Medicine, London SW7 2BP.

\* cited by examiner

Primary Examiner—Bhavesh M. Mehta
Assistant Examiner—Sheela C Chawan
(74) Attorney, Agent, or Firm—Stevens, Davis, Miller & Mosher, LLP

(57) ABSTRACT

A spatial filtering method providing quick detection and visualization of irregularities of SEM images of components such as integrated circuits includes the steps of: (a) acquiring a digital image as a two-dimensional array of pixel data from an original image; (b) calculating a first Fourier transform to generate a two-dimensional array of complex data; (c) calculating a power spectrum to provide a real function representing a weighting of each spatial frequency in the original image; (d) generating a mask for suppressing regular structures of the original image and undesirable artifacts introduced by the acquiring of the digital image in step (a); (e) dilating the mask generated in step (d) by extending masking spots generated therein to increase the suppression of regular structures of the original image; (f) applying the mask dilated in step (e) to the data from the first Fourier transform for removing periodic data to result in a second Fourier transform; (g) calculating an inverse Fourier transform of the data of the second Fourier transform to obtain a spatially filtered image; (h) scaling the spatially filtered image to greyscale; and (i) providing a visual representation of the greyscaled image obtained in step (h).

6 Claims, 9 Drawing Sheets

STEP 160

APPLY AN INVERSE FOURIER TRANSFORM TO THE DIGITAL IMAGE MASKED IN STEP 150 TO OBTAIN A SPATIALLY FILTERED IMAGE ACCORDING TO THE EQUATION $$f(x,y) = 1/N \sum_{u=0}^{N-1} \sum_{v=0}^{N-1} F(u,v)\, e^{+2\pi j(ux+vy)}$$

STEP 170

SCALE THE SPATIALLY FILTERED IMAGE OBTAINED IN STEP 160 TO GREYSCALE

STEP 180

VISUALIZE THE GREYSCALED IMAGE

END

FIG. 1B

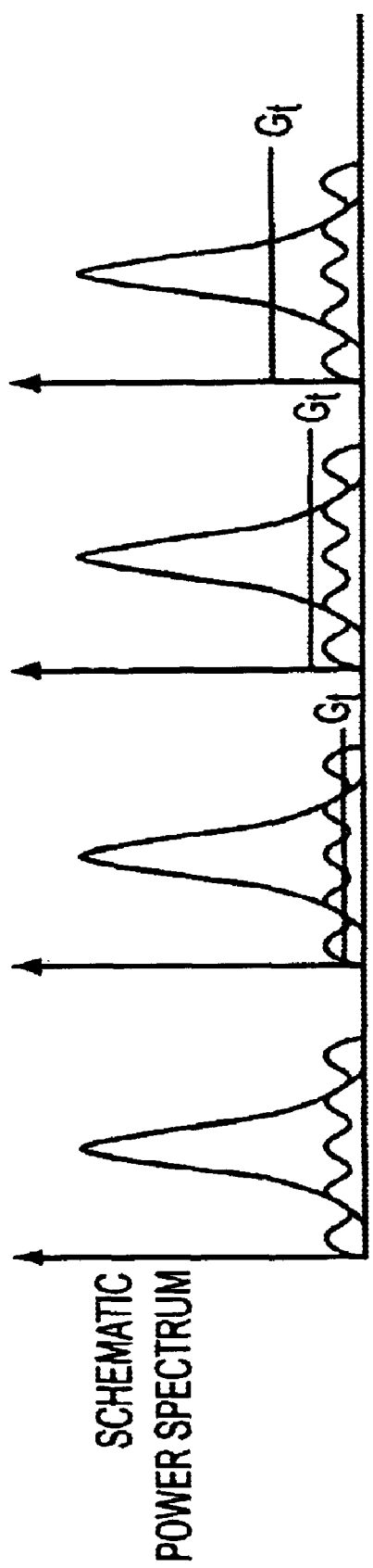

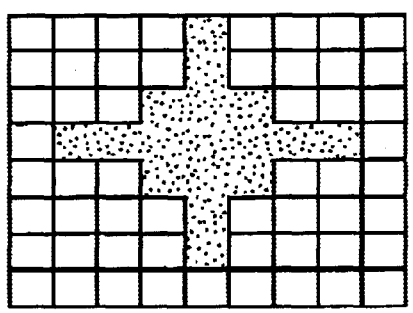  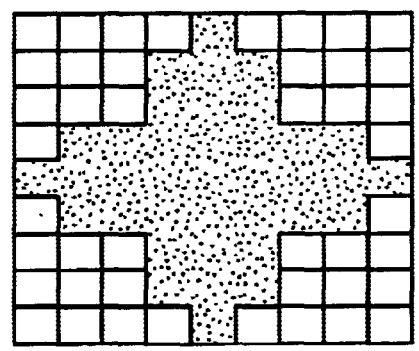
FIG. 5A                    FIG. 5B

SPATIAL FILTERING METHOD FOR FAILURE ANALYSIS OF A DEVICE

BACKGROUND OF THE INVENTION

1. Field of the Invention

The present invention relates to optical detection systems for failure analysis of devices. More particularly, the present invention relates to a spatial filtering tool for integrated circuit or semiconductor wafer failure analysis for use in a commercial or laboratory fabrication environment.

2. Description of the Prior Art

Many devices, such as integrated circuits or semiconductor wafers, have structural patterns which can be detected by optical inspection systems in both a spatial domain and a frequency domain. In the prior art, optical inspection of such devices has been accomplished using several methods.

One such method employs an optical bench and visual inspection of the device thereon. The length of time required for such inspections renders this method impractical in an industrial environment. In addition, this type of inspection is prone to human error and, therefore, has limited application to a laboratory environment.

Other known optical inspection methods employ general image processing software suites and even hardware inspection systems, but these methods are incompatible with a commercial fabrication environment or a laboratory fabrication environment because they do not offer an optimized, automatic solution. To use these methods, spatial filtering must be "hand-crafted" to the device being inspected. Therefore, these methods are more suited to research because their use requires a high degree of customization and expertise.

Another known optical inspection method uses inline inspection tools. Such existing inline tools require expensive hardware, and lack the flexibility required in a failure analysis environment implemented in a laboratory.

Yet another technique uses conventional Scanning Electron Microscopy (SEM) images provided by a finely focused electron beam scanned across the surface of a sample and then inspected visually for defects (irregularities) by engineers or technicians in a failure analysis (FA) laboratory. While this approach is generally acceptable for both commercial and laboratory environments, small irregularities can be difficult to find.

Various refinements of SEM methods have been attempted to make detection of small irregularities easier. Spatial filtering has been applied to an SEM image of an object by using slides of SEM micrographs and a laser optical bench. By manually constructing a mask for the diffraction peaks formed in the optical path, the masked, reconstructed image primarily comprises defects. With the majority of the acceptable area masked, this approach facilitates the detection and study of just the defective areas of a circuit.

U.S. Pat. No. 6,021,214 to Evans et al. discloses a hybrid technique for finding defects using digitized images of a device and a combination of spatial domain and frequency domain techniques. Evans et al. teach obtaining two dimensional spectra of images of two samples of the device using Fourier-like transforms, removing any strong harmonics with a spectral filter, aligning the images and transforming them back to the spatial domain where they are then subtracted and the difference image analyzed for defects. Frequency domain techniques are employed to align the images.

In addition, U.S. Pat. No. 5,506,676 to Hendler et al. discloses defect detection using Fourier optics and a spatial separator. The Fourier transform components of an ideal pattern are compared to the Fourier transform components of a measured pattern, and differences in relative intensities of the spatial components indicate defects.

The contents of each of the above-discussed references are are hereby incorporated by reference.

The power spectrum of the image of a periodic circuit comprises a regular array of bright spots, which correspond to the periodic features in the circuit, and a darker background, which contains most of the information due to the presence of irregular defects. This power spectrum of a regular array of bright spots is an ideal target for masking techniques. In the prior art, two approaches are employed to define which spatial frequencies in the power spectrum should be masked out.

The first approach to masking spatial frequencies is referred to as "manual mask definition," which involves manually defining the bright spots of a circuit image in the power spectrum. This approach is extremely time consuming, because it requires manual intervention. It is also prone to human error.

The second approach to masking uses Fourier analysis, whereby a periodic waveform is deconstructed into a series of sine waves or cosine waves, the resultant transform is masked for regular features, and then the masked transform is subjected to an inverse Fourier transform to obtain an image which allows visualization of any defects. This second approach to masking spatial frequencies is referred to as "using a golden circuit area" whereby the Fourier transform of a perfect region of the circuit is subtracted from a Fourier transform of a test area. Then, an inverse Fourier transform is performed on the difference, and because of the subtraction, only the defects are reconstructed. This second approach has the disadvantage of requiring that a suitable "golden circuit area" (i.e., flawless area) needs to be defined.

Thus, the prior art lacks a quick method to detect and visualize irregularities in SEM images of regular integrated circuits, that is both fully automatic and fine-tunable.

SUMMARY OF THE INVENTION

The present invention overcomes the above-noted problems of the prior art by providing such a quick method for visualization of irregularities which may be defects, in the images of regular integrated circuits. The method of the present invention is both fully automatic, and fine-tunable. To this end, according to the present invention, there is provided a spatial filtering method comprising the steps of:

(a) acquiring a digital image of a two-dimensional array of pixel data from an original image;

(b) calculating a first Fourier Transform of the acquired image data to generate a two-dimensional array of complex data from the equation:

$$F(u, v) = 1/N \sum_{x=0}^{N-1} \sum_{y=0}^{N-1} f(x, y) e^{-2\pi j(ux+vy)};$$

(c) calculating a power spectrum for the first Fourier Transform calculated in step (b) to provide a real function representing a weighting of each spatial frequency in the original image from the equation:

$$P(u,v) = \log(1 + F(u,v)F^*(u,v));$$

(d) generating a mask from the power spectrum calculated in step (c) to apply to the data resulting from step (b) for suppressing regular structures of the original image and undesirable artifacts introduced by the acquiring of the digital image in step (a);

(e) dilating the mask generated in step (d) by extending masking spots generated therein to increase the suppression of regular structures of the original image;

(f) in order to remove periodic data, applying the mask dilated in step (e) to the first Fourier transform calculated in step (b) which results in a second Fourier transform;

(g) calculating an inverse Fourier transform of the second Fourier transform of the digital image masked in step (f) to obtain a spatially filtered image or defect image from the equation:

$$f(x, y) = 1/N \sum_{u=0}^{N-1} \sum_{v=0}^{N-1} F(u, v) e^{+2\pi j(ux+vy)};$$

(h) scaling the spatially filtered image to greyscale; and (i) providing a visual representation of the greyscaled image obtained in step (h).

In a first aspect of the present invention, the mask generation in step (d) is performed by calculating a brightness intensity threshold in the power spectrum which includes the brightest 10% of the pixels. These pixels then form the initial mask of detected bright spots (0)'s and background (1)'s.

In a second aspect of the present invention, the dilating of the mask in step (e) may include extending the mask to maximize suppression of X and Y extensions which relate to SEM artifacts from the scanning. Each pixel in the original mask which is 1 is set to 0 if it has neighbors in the horizontal or vertical direction.

In a third aspect of the present invention, the visualizing of the image in step (i) includes providing automatic switching between a display of the original image and the greyscaled image, the switching being controlled by a timer.

In a fourth aspect of the present invention, the visualizing of the image in step (i) includes providing on-demand switching between a display of the original image and the greyscaled image.

BRIEF DESCRIPTION OF THE DRAWINGS

Other objects, features, and advantages of the present invention will become more fully apparent from the following detailed description of the preferred aspects, the appended claims, and the accompanying drawings. As depicted in the attached drawings:

FIGS. 1A and 1B are flowcharts which provide an overview of the steps of a preferred embodiment of the present invention.

FIGS. 4A, 4B and 4C illustrate an example of the generation of a mask according to a brightness intensity threshold in the power spectrum.

FIGS. 5A and 5B illustrate the dilation of the generated mask illustrated in FIGS. 4A–4C, according to the present invention.

DETAILED DESCRIPTION OF THE PREFERRED EMBODIMENTS

The present invention will now be described in terms of the currently perceived preferred aspects thereof.

Figure 1A:
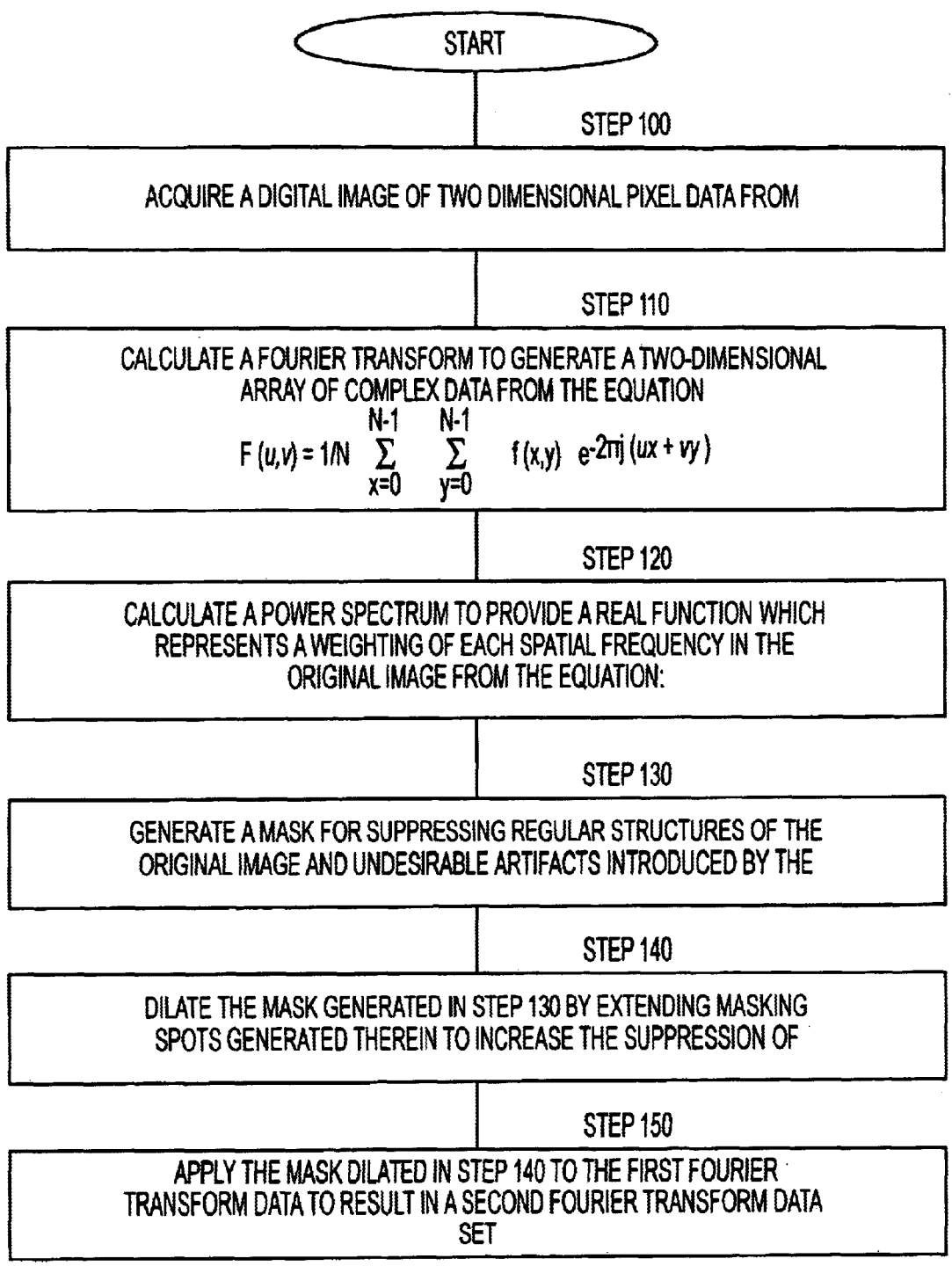

FIGS. 1A and 1B are flowcharts illustrating a preferred embodiment of the spatial filtering tool for failure analysis according to the present invention. In this embodiment, the spatial filtering tool used was written in Visual C++, and can run on any PC-based SEM or similar tool, by importing images in TIFF (tagged information file format) or BMP (bit mapped) format. However, it is understood by a person of ordinary skill in the art that other languages could be used without departing from the spirit of the present invention and the scope of the appended claims.

Figure 2:
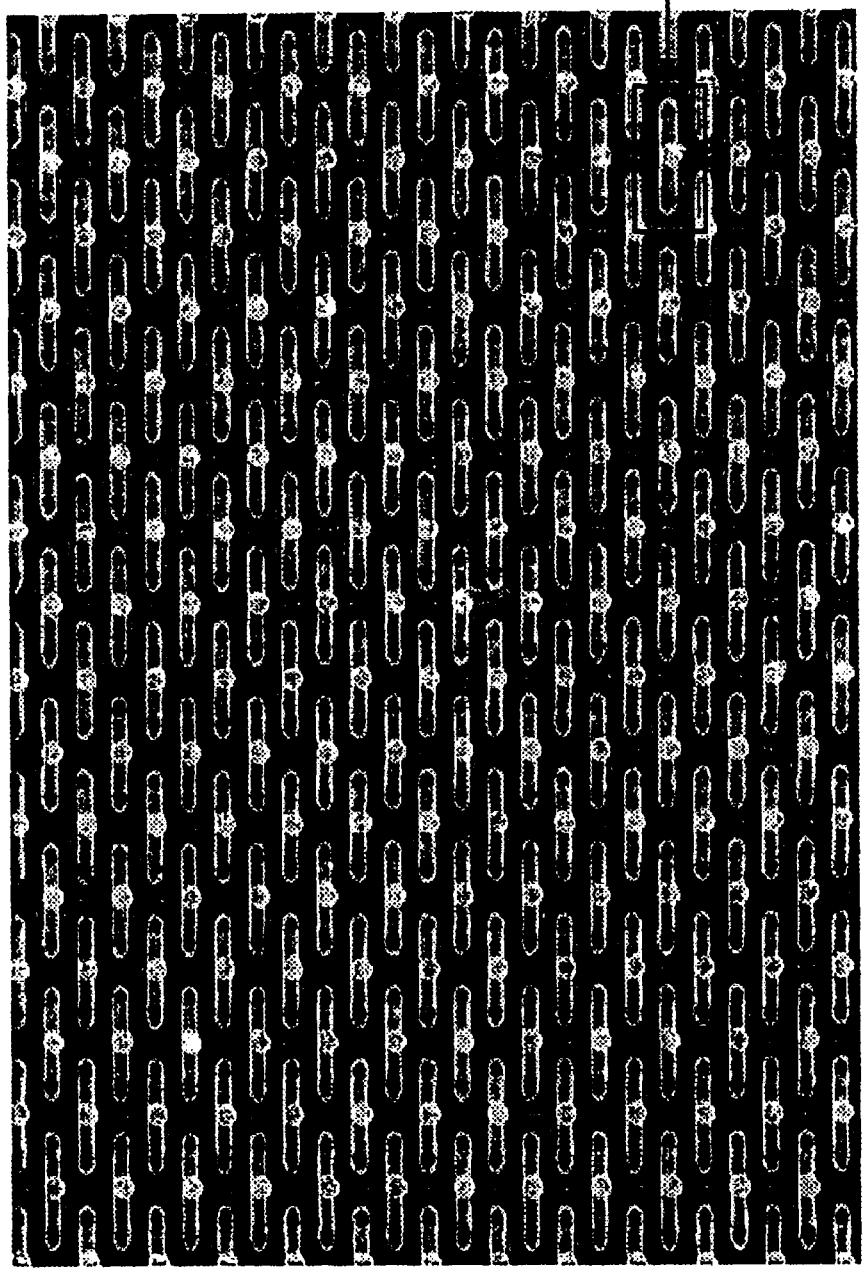
FIG. 2 is an illustration of an acquired digital image according to the preferred embodiment illustrated in FIGS. 1A and 1B.

According to FIG. 1A, at step 100, a digital image is acquired from an original image of an integrated circuit, for example. Typically, this digital image is an SEM image of the integrated circuit, and comprises two-dimensional pixel data. An example of such a digital image acquired in step 100 is illustrated in FIG. 2.

At step 110, in order to generate a two-dimensional (2-D) array of complex data, a Fourier Transform of the acquired digital image is calculated using the equation:

$$F(u, v) = 1/N \sum_{x=0}^{N-1} \sum_{y=0}^{N-1} f(x, y) e^{-2\pi j(ux+vy)};$$

At step 120, the power spectrum of this 2-D Fourier Transform is calculated. This power spectrum is calculated to provide a function which represents the weighting of each spatial frequency in the original image. It is calculated using the equation:

$$P(u,v) = \log (1 + F(u,v)F^*(u,v,));$$

This power spectrum includes information from: 1) regular structures; 2) noise and defects; and 3) artifacts due to SEM characteristics (extensions to spots in X and Y domains) which arise due to the scanning characteristics of the SEM, and minute fluctuations in the image position with time.

Figure 3:
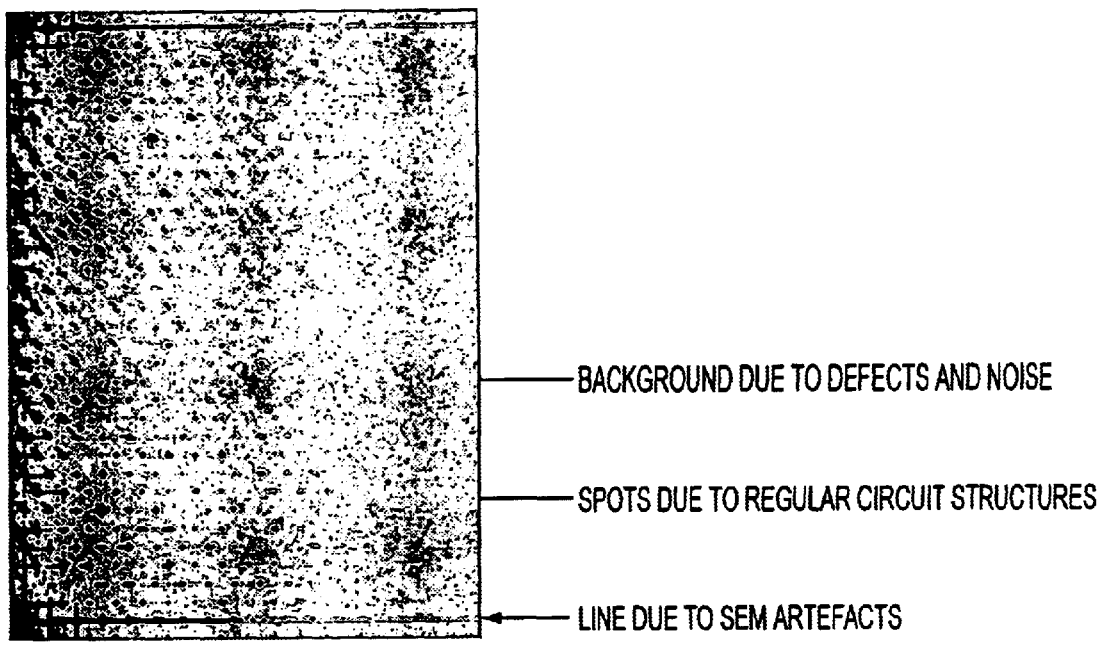
FIG. 3 is an illustration of the acquired digital image in FIG. 2 after the power spectrum has been calculated and weighted according to a preferred embodiment of the present invention.

FIG. 3 illustrates the image after the power spectrum has been calculated in step 120. The information from regular or periodic structures is represented by the bright spots, and the noise and defects are represented by the darker areas. The extensions to spots in the X and Y domains are the artifacts due to SEM characteristics.

At step 130, a mask is generated for suppressing the regular or periodic structures of the original image as well as the undesirable artifacts introduced by the SEM process. The mask generation is performed by calculating a brightness intensity threshold in the power spectrum which includes the brightest 10% (this is a tunable parameter) of the pixels. These pixels then form the initial mask of detected bright spots (0) and background (1).

Figure 4B:
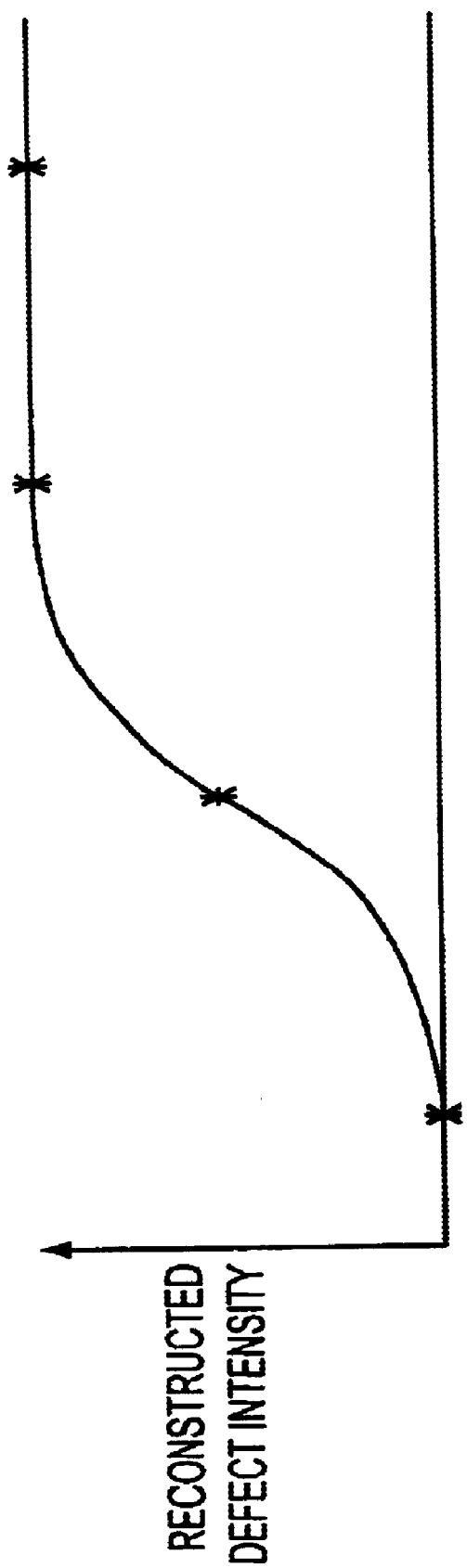
Figure 4C:
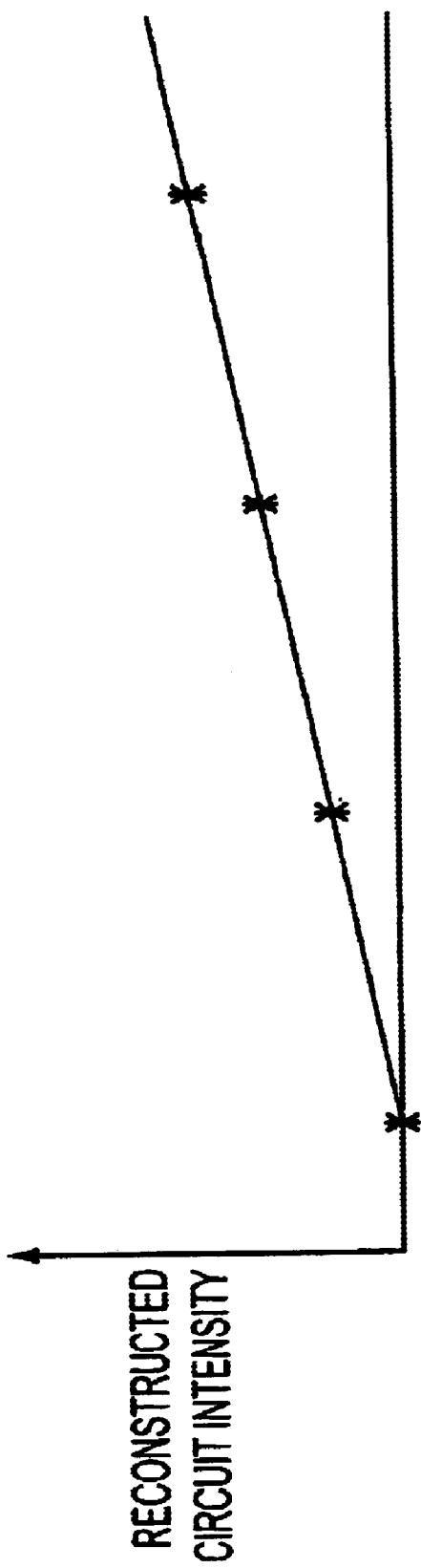

In order to better understand the mask generation in step 130, FIGS. 4A–4C provide respective graphs of the schematic power spectrum, the reconstructed defect intensity and the reconstructed circuit intensity after the generation of the mask. FIGS. 4A–4C illustrate plots of the power spectrum grey level versus the spatial frequency, which is referred to as u. Each of the graphs shows the same small area near one power spectrum spot, and shows a peak for the spot surrounded by a low amplitude background for the defects. The spatial frequencies of all of the plots above the horizontal line Gt are eliminated. On average, the number of spatial frequencies from a circuit or defect feature which are included will be proportional to the reconstructed brightness of the feature. Thus, as Gt is raised in the successive graphs shown in FIG. 4A, the low-level defect information is soon fully reconstructed, and the defect intensity (shown in FIG. 4B) levels off. For the periodic features, more of the main spot is still being included, and the circuit intensity continues to increase much longer, as shown in FIG. 4C.

To remove the artifacts due to the periodic features, the mask generated in step 130 is dilated in step 140 by extending masking spots to increase the suppression of the regular structures of the original image. In other words, the mask dilation extends approximately one or two pixels (in this particular case) in both the X- and Y-directions.

FIGS. 5A and 5B illustrate an example of the mask dilation performed in step 140. The spots in the mask must be extended in order to catch all of the information due to the regular or periodic pattern but without suppressing too much of the random defect information. It is also desirable to extend the spots in a way which maximizes suppression of X and Y extensions of the spots, because these relate to SEM artifacts originating from the nature of such scanning. To accomplish this dilation, in a preferred embodiment of the present invention, each pixel in the original mask which is 1 is set to 0 if it has neighbors in the horizontal or vertical direction. This suppresses both regular S or periodic circuit structure and SEM artifacts. Besides, for the purpose of maintaining the average image intensity level, the zero frequency points can be set to 1.

At step 150, the dilated (i.e., resulting) mask is applied to remove periodic data from the Fourier transform and results in a second set of complex data corresponding to a second Fourier transform.

At step 160, an inverse Fourier Transform of the second Fourier transform is applied to the second set of complex data resulting from step 150 to obtain a spatially filtered original image. This transform is accomplished by applying to the inverse equation:

$$f(x, y) = 1/N \sum_{u=0}^{N-1} \sum_{v=0}^{N-1} F(u, v)e^{+2\pi j(ux+vy)};$$

Figure 6:
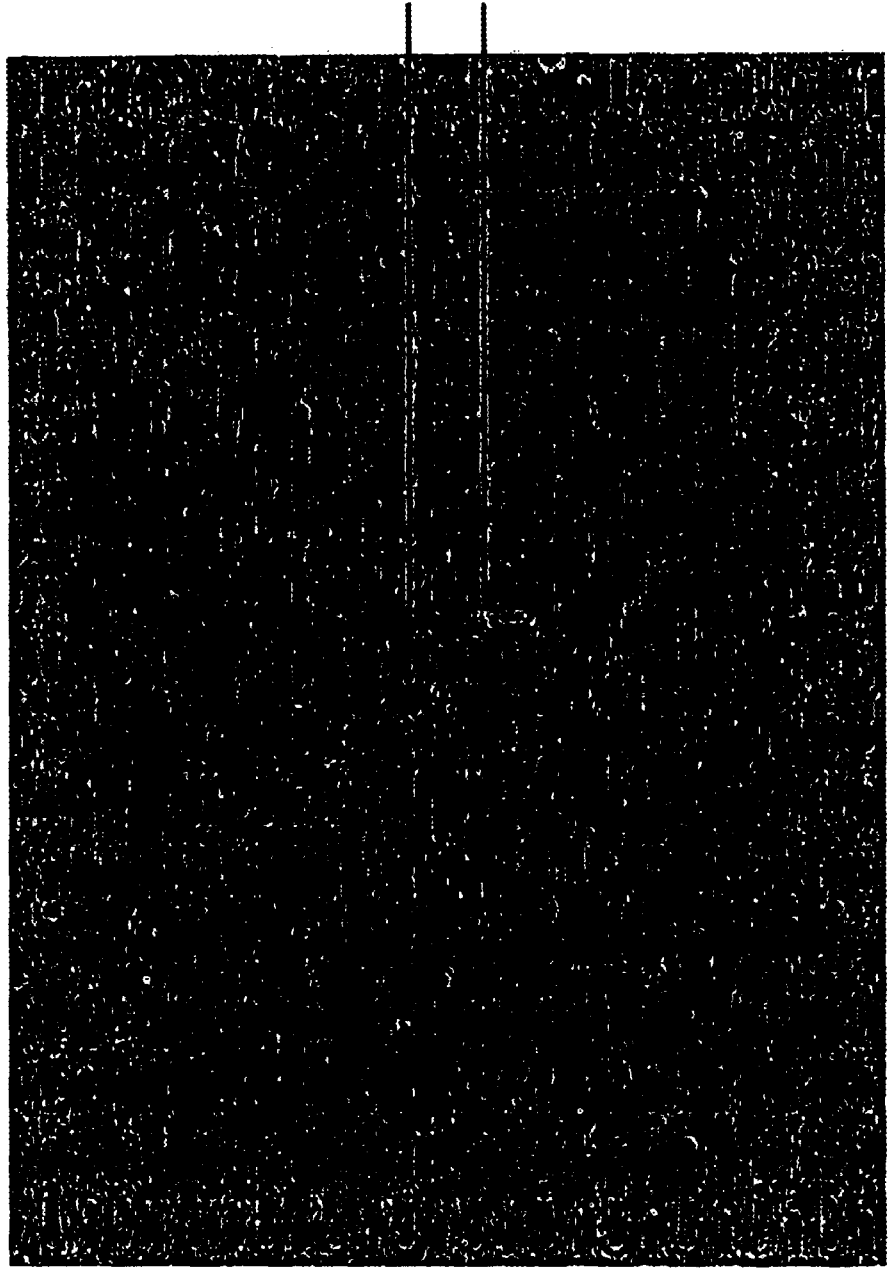
FIG. 6 is a grayscale image after the mask of FIG. 5B is applied and an inverse transform is performed.

At step 170, the spatially filtered image is scaled to greyscale and this image is visualized (displayed) at step 180. FIG. 6 shows an example of a visualized image of an integrated circuit.

Although the resulting visualized image shown in FIG. 6 makes small irregularities more visible, the original image may be referred to by one of several techniques, such as switching between a display of the original image and a display of the resulting visualized image in-place and on demand, and/or by the use of automatic switching controlled by a timer.

Accordingly, the present invention provides a quick (approximately 2–3 seconds) method for visualizing and detecting irregularities in SEM images of periodic items such as integrated circuits.

It will be apparent that various modifications and adaptations may be made to the present invention by those skilled in the art which fall within the scope and spirit of the appended claims. For example, the item scanned may be another electrical component other than an integrated circuit, or it could be any substance in which it is desirable to have accurate comparisons for failure analysis in a short period of time.

What is claimed is:

1. A spatial filtering method comprising the steps of:
    (a) acquiring a digital image comprising a two-dimensional array of pixel data from an original image;
    (b) calculating a first Fourier Transform of the digital image to generate a two-dimensional array of complex data from the equation:

$$F(u, v) = 1/N \sum_{x=0}^{N-1} \sum_{y=0}^{N-1} f(x, y)e^{-2\pi j(ux+vy)};$$

(c) calculating a power spectrum to provide a real function representing a weighting of each spatial frequency in the two-dimensional array of complex data calculated in step (b) from the equation:

$$P(u,v)=\log(1+F(u,v)F^*(u,v));$$

(d) generating a mask for suppressing periodic structures of the original image and undesirable artifacts introduced by the acquiring of the digital image in step (a);
    (e) dilating the mask generated in step (d) by extending masking spots generated therein to increase suppression of periodic structures of the original image;
    (f) applying the mask dilated in step (e) to remove the periodic data from the first Fourier transform resulting from step (b) to result in a second set of complex data corresponding to a second Fourier transform;
    (g) calculating an inverse Fourier transform using the second set of complex data corresponding to the second Fourier transform of the digital image masked in step (f) to obtain a spatially filtered original image from the equation:

$$f(x, y) = 1/N \sum_{u=0}^{N-1} \sum_{v=0}^{N-1} F(u, v)e^{+2\pi j(ux+vy)};$$

(h) scaling the spatially filtered image to greyscale; and
    (i) providing a visual representation of the greyscaled image obtained in step (h).

2. The method according to claim 1, wherein step (d) includes calculating a brightness intensity in the power spectrum which includes 10% of the brightest pixels forming the mask of detected bright spots.

3. The method according to claim 1, wherein step (e) includes dilating the mask by approximately one or two pixels in both an X and a Y direction for each mask point.

4. The method according to claim 1, wherein step (i) includes providing automatic switching between a display of the original image and a display of the greyscaled image by a timer.

5. The method according to claim 1, wherein step (i) includes providing on-demand switching between a display of the original image and a display of the greyscaled image.

6. The method according to claim 1, wherein step (e) further includes keeping the zero frequency points.

* * * * *